(12) United States Patent
Vitone, Jr. et al.

(10) Patent No.: US 6,386,829 B1
(45) Date of Patent: May 14, 2002

(54) MULTI-VALVE ARC INLET FOR STEAM TURBINE

(75) Inventors: Edward T. Vitone, Jr., Ashburnham; John B. Haven, Sterling; Michael R. Kolk, Ashburnham, all of MA (US)

(73) Assignee: Power Technology, Incorporated, Fitchburg, MA (US)

( * ) Notice: Subject to any disclaimer, the term of this patent is extended or adjusted under 35 U.S.C. 154(b) by 0 days.

(21) Appl. No.: 09/347,078

(22) Filed: Jul. 2, 1999

(51) Int. Cl.[7] .............................. F01D 1/02; F03B 1/04; F04D 29/44
(52) U.S. Cl. ...................................................... 415/185
(58) Field of Search ................................ 415/151, 155, 415/165, 185, 202

(56) References Cited

U.S. PATENT DOCUMENTS

| | | | |
|---|---|---|---|
| 643,505 A | * | 2/1900 | Igelhorst .................. 415/155 X |
| 888,248 A | * | 5/1908 | Matthews .................... 415/155 |
| 1,197,283 A | | 9/1916 | Gibson |
| 2,039,815 A | * | 5/1936 | Lupfer ........................ 415/155 |
| 2,147,874 A | * | 2/1939 | Zetterquist .............. 415/155 X |
| 2,389,074 A | | 11/1945 | Newton |
| 3,097,489 A | | 7/1963 | Eggenberger et al. |
| 3,310,069 A | | 3/1967 | Hoffman et al. |
| 3,350,061 A | | 10/1967 | Strass |
| 4,120,159 A | | 10/1978 | Matsumoto et al. |
| 4,325,670 A | | 4/1982 | Silvestri, Jr. |
| 4,604,028 A | | 8/1986 | Yeaple et al. |
| 4,719,757 A | | 1/1988 | Nakazawa et al. |
| 4,767,055 A | | 8/1988 | Ward |
| 4,781,528 A | | 11/1988 | Hagita et al. |
| 4,799,856 A | | 1/1989 | Matsudaira et al. |
| 4,847,039 A | | 7/1989 | Kendall et al. |
| 4,850,793 A | | 7/1989 | Silvestri, Jr. et al. |
| 4,888,954 A | | 12/1989 | Silvestri, Jr. |
| 4,903,490 A | | 2/1990 | Silvestri, Jr. |
| 4,940,383 A | | 7/1990 | Silvestri, Jr. |
| 5,076,756 A | | 12/1991 | Kobayashi |
| 5,133,189 A | | 7/1992 | Hurley |
| 5,136,848 A | | 8/1992 | Silvestri, Jr. |
| 5,191,764 A | | 3/1993 | Silvestri, Jr. |
| 5,333,457 A | | 8/1994 | Silvestri, Jr. |
| 5,415,202 A | | 5/1995 | Shiffler et al. |
| 5,601,405 A | * | 2/1997 | Coates ........................ 415/202 |
| 5,694,967 A | | 12/1997 | Schultz |
| 6,196,793 B1 | * | 3/2001 | Braaten ...................... 415/191 |

FOREIGN PATENT DOCUMENTS

| | | |
|---|---|---|
| CA | 2138462 | 6/1995 |
| JP | 7-238801 | 9/1995 |
| JP | 8-218806 | 8/1996 |
| JP | 9-195709 | 7/1997 |
| SU | 1763680 | 7/1990 |

* cited by examiner

Primary Examiner—John E. Ryznic
(74) Attorney, Agent, or Firm—Bowditch & Dewey, LLP

(57) ABSTRACT

A steam turbine has multiple valves for introducing steam into a steam turbine. Each of the input valves introduce steam flow around the entire the 360 degree arc. The set of nozzles are each divided into a plurality of chambers. Each set of chambers extends around the full arc of the turbine. Each set has a valve. The chambers are designed so that all valves are open when the turbine is running at maximum output. The chambers are sized such that valve throttling losses are minimized when the turbine is at its normal operating condition.

20 Claims, 12 Drawing Sheets

MULTI-VALVE ARC INLET FOR STEAM TURBINE

BACKGROUND OF THE INVENTION

Steam turbines are used for many types of drive as prime movers. Drives include, but are not limited to, propulsion systems, generation of electricity, pumps and compressors. A ship propeller is one form of propulsion that can be driven by steam turbines.

While steam turbines can be in many shapes and forms, steam turbines all have some common elements. The steam turbine has a moving set of blades attached to a shaft to transmit the power. A set of stationary blades or nozzles are used to direct the steam towards the rotor or moving blades, where the blades are attached to the shaft. The two sets of blades are referred to together as a stage.

In one of several steam turbine designs, the first stage, the first set of stationary blades and the first set of rotor or moving blades, acts as an impulse stage in which the pressure of the steam drops as the steam passes through the stationary blades and remains relatively constant as the steam passes through the moving blades. As the pressure drops, the velocity of the steam increases as the steam passes through the stationary blades. The velocity of the steam decreases as the rotor blades transmit the energy to rotate the shaft.

The process of decreasing pressure to control or limit flow of steam or fluid is called throttling. The process of throttling results in a loss of energy. One of the factors in determining the amount of energy loss is how well a control or throttle valve is tailored to the amount of flow required to produce normal power versus the flow required to produce maximum power. Typically the valve is designed for the maximum fluid flow that is required by the steam turbine or other power producing device. As the amount of fluid (steam) which is flowing at one time through the valve is decreased, the throttling losses increase.

To increase the efficiency in throttling of the steam turbine, inlet valves are configured as multiple valves which are opened sequentially. Each of the valves are open such that only one valve is partially open. (i.e., the other valves are completely closed or completely open.) Each valve directs the flow of steam to a portion of the entire arc, for example six (6) valves each would direct flow to 60 degrees of the 360 degree full-arc of the turbine. If the turbine was running at 70 percent power, four valves are open completely, one valve is closed and the sixth is partially open. In practice, the power produced, or steam flow through the valves may not be proportional to the number of valves open.

SUMMARY OF THE INVENTION

It is recognized that the introduction of steam in a segment of the arc and not in the entire arc, results in a phenomenon which causes greater stimulus on the first stage buckets or blades and higher radiated noise. However, a single valve turbine which introduces fluid to the entire arc results in inefficiencies due to throttling losses of the valve.

The invention relates to a steam turbine which has multiple valves for introducing steam into a steam turbine. Each of the input valves introduce steam flow around the entire 360 degree arc. A uniform flow is introduced completely around the shaft and to the moving blades. The set of nozzles (stationary blades) are each divided into a plurality of circumferential chambers in a axial flow turbine and a plurality of axial chambers in a radial flow turbine.

Each set of chambers extends around the full arc of the turbine. Each set has a valve for controlling the flow of steam into the respective chamber. The chambers are designed so that all valves are open when the turbine is running at maximum output. The chambers are sized such that each valve is either open or closed when the turbine is at its normal or reduced output operating condition. For example, if the steam turbine is typically operated at 65 percent power output, and has two chambers, one chamber and its controlling valve would be sized to provide the steam flow required to produce 65 percent power, and the second valve and chamber sized to provide the additional flow to produce the remaining 35 percent power. The valve of the first chamber would be open and the valve of the second chamber would be closed during normal 65 percent power operation.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 3:
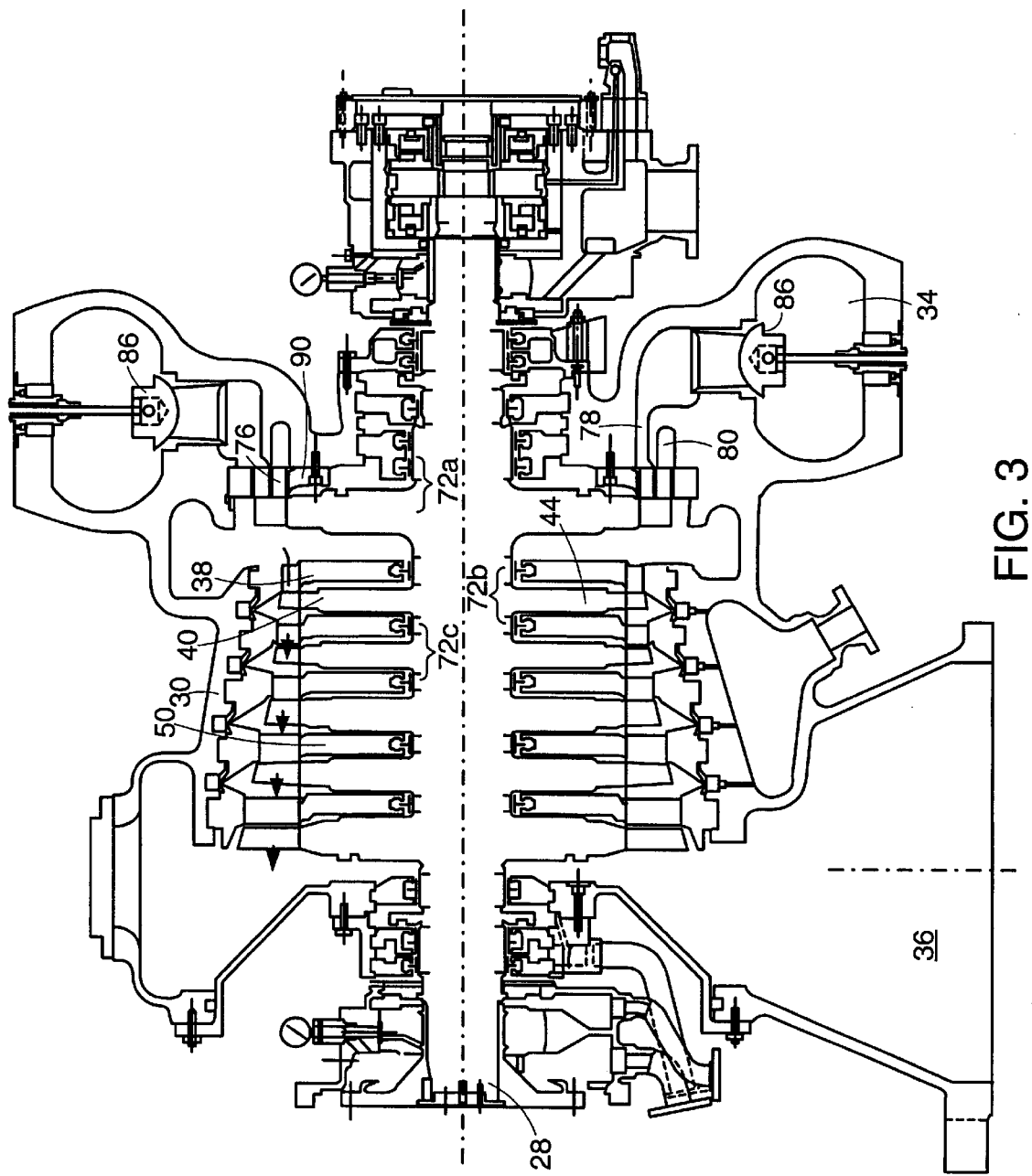
FIG. 3 is a sectional view of a steam turbine according to the invention.

Referring to the drawings in detail, where like numerals indicate like elements, there is illustrated a steam turbine in accordance with the present invention, generally referred to as 20 in FIG. 3.

Figure 1A:
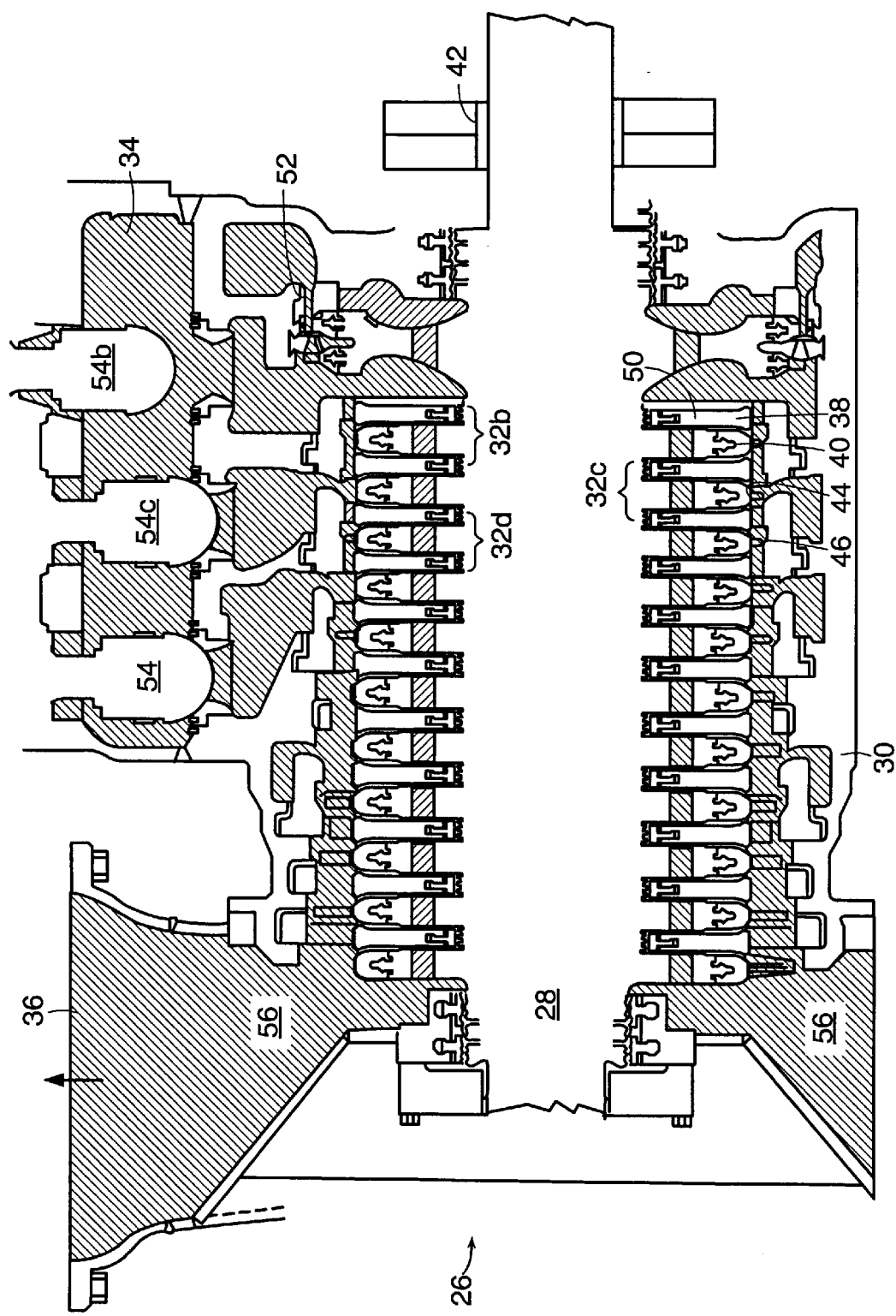
FIG. 1A is a sectional view of a high pressure steam turbine of the prior art.

A prior art steam turbine 26 is shown in FIG. 1A. The steam turbine 26 has a rotatable shaft 28 located in a casing or housing 30. The steam turbine 26 has a plurality of stages 32, through which the steam passes from an inlet 34 to an outlet 36. Each stage 32 has a stationary portion 38 and a rotating portion 40. The stationary portion 38 directs steam to the rotating portion 40 as explained below.

Figure 1B:
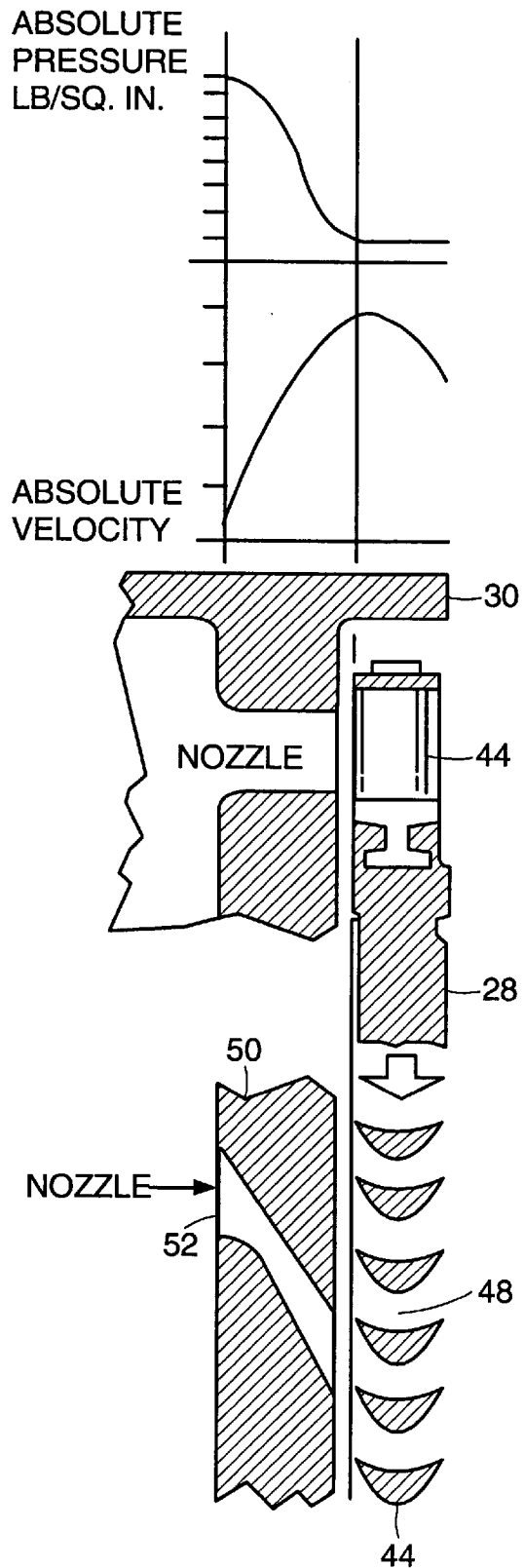
FIG. 1B is an enlarged view of a stationary blade or nozzle and a plurality of rotary blades.

The rotatable shaft 28 is carried by a plurality of bearings 42. The rotary portion 40 of each of the stages 32 of the steam turbine 26 has a plurality of blades 44 mounted to the shaft 28. Each stage 32 of the moving blades 44 forms a cylindrical disk 46 having a plurality of radial openings 48 defining blades or "buckets" through which the steam passes as seen in FIG. 1B. The stationary portion 38 of each of the stages 32 of the steam turbine 26 has a plurality of blades or sections 50 carried by the casing 30. A plurality of openings 52 interposed between the blades or sections 50 define nozzles through which the steam passes. The stationary nozzles direct the flow of steam towards the moving blades, as seen in FIG. 1B.

Figure 1C:
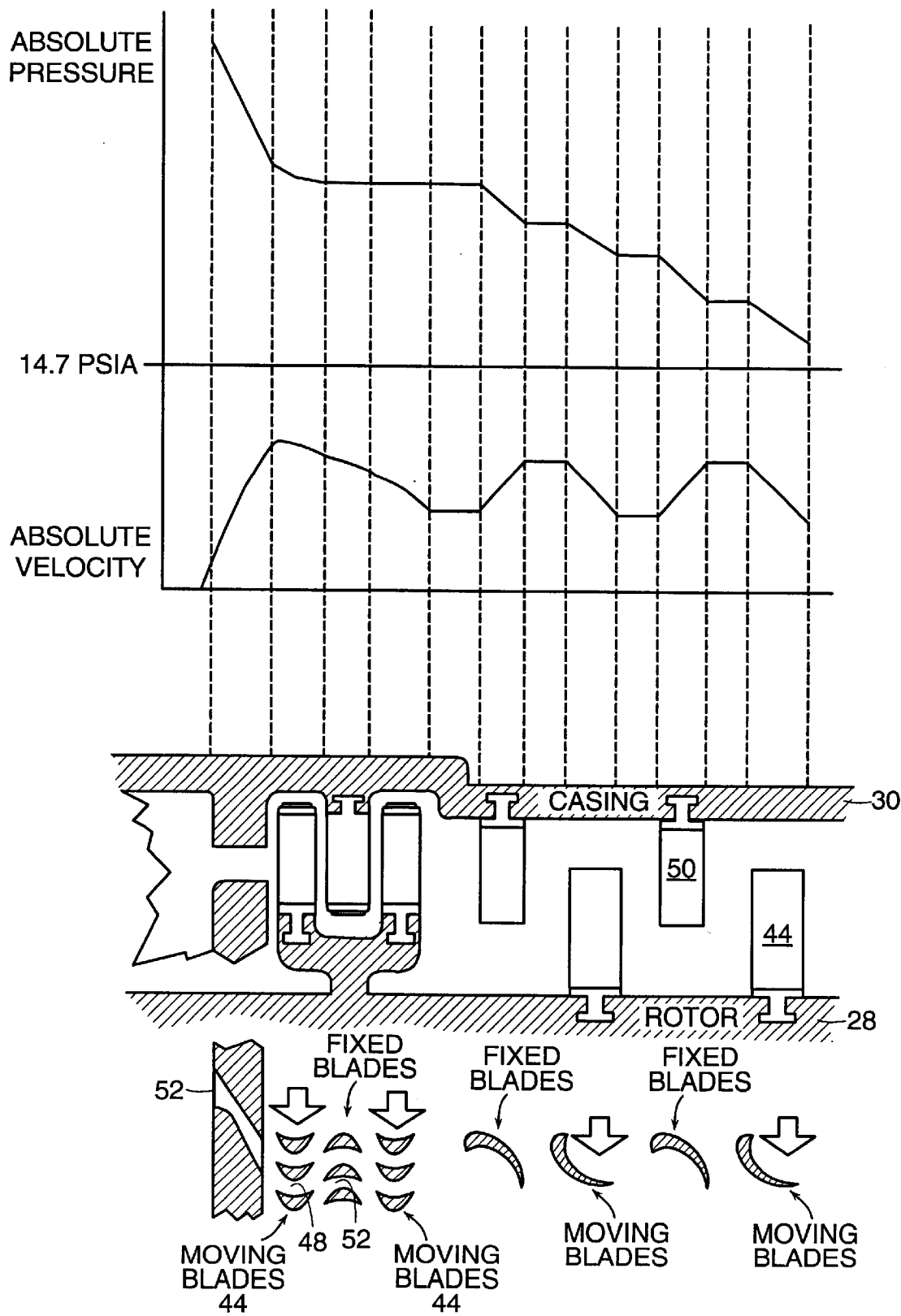
FIG. 1C is an enlarged view of a section of a combined impulse and reaction type turbine.

As steam passes through the steam turbine from the inlet 34 having one or more control valves 54 to an exhaust casing 56 at the outlet 36, the pressure and velocity of the steam varies as energy is extracted from the steam to rotate the shaft 28. The relationship between the pressure and the velocity of the steam is dependent on the type of stage the steam is passing through whether it is an impulse stage such as shown in FIG. 1B, a reaction stage, or a compounded stage which combines benefits of both, such as shown in FIG. 1C.

The steam turbine is designed with the stages 32, including the nozzles 52, designed to maximize the energy extracted from the steam and converted into rotary energy. This includes the nozzles 52 which introduce the steam into the housing initially. If the steam turbine 26 is running at a constant rate, the components of the steam turbine 26 can be designed so that extracted energy is maximized. However, steam turbines 26 are typically developed to run at varying speeds and or power outputs depending on the desired output. For example, the amount of steam input into a steam turbine may be decreased and the rotational speed therein decreased if the turbine is used to drive a main reduction gear of a power plant to drive a ship. If the turbine is used to drive a generator and the energy use associated with output of the generator is decreased, the amount of steam input will decrease accordingly.

The efficiency of the steam turbine 26 decreases as the amount of fluid (steam) entering the steam turbine 26 is decreased. This reduction in the amount of steam results in the stationary blade or nozzle having insufficient mass of steam to work efficiently. Prior to passing through the nozzle, the steam is throttled to reduce its flow. As steam passes through the nozzle the pressure drops and the steam velocity increases, however the increase in velocity is not as great for that pressure drop as would be achieved if the nozzle was designed for that flow rate of steam, i.e., a full throttle loading with little or no throttling loss. This decrease in fluid velocity results in a decrease in efficiency as seen in FIG. 2.

Figure 2:
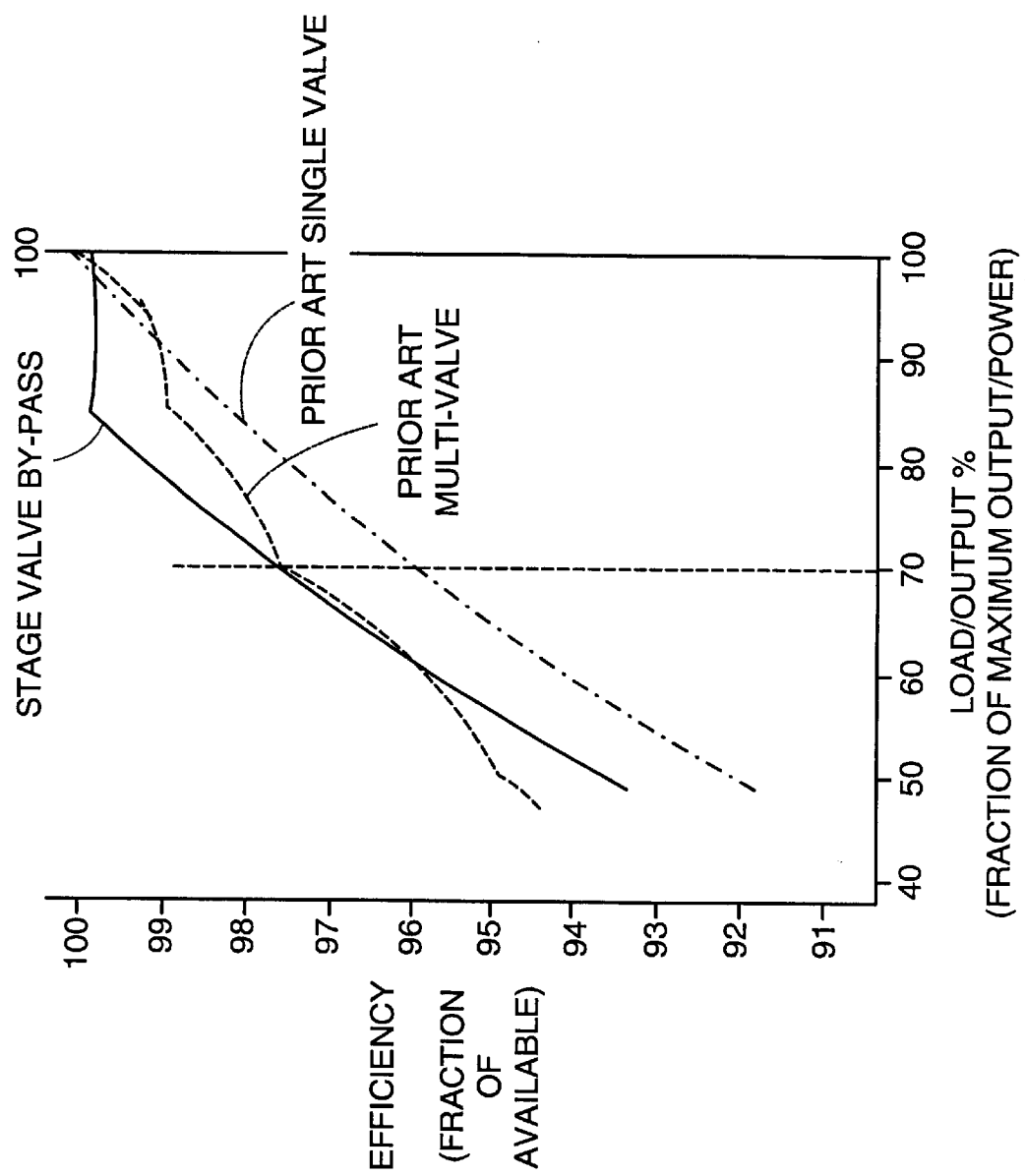
FIG. 2 is a diagram of internal efficiency of various prior art steam turbines.

FIG. 2 is a comparison diagram of the internal efficiency of various prior apparatus and methods for introducing steam to a steam turbine running at less than full throttle or load. The diagram represents the fraction of available internal efficiency and the output.

In order to increase efficiency at less than 100 percent loaded operations, several techniques have been used to maximize efficiency. One prior art technique is to introduce the steam prior to the first stage using multiple valves, each distributing steam to a plurality of nozzles in a partial segment or arc. Each partial segment or arc is a portion of the complete 360 degree arc and is connected to an individual valve. As the percent loaded increases, more valves are opened with each nozzle associated with a respective valve working at top efficiency when its associated valve is open completely. Therefore, the loss when not at 100 percent loading is minimized. For example, for a six valve configuration where each valve is connected to a plurality of nozzles for a portion of the arc, e.g. each portion is 60° or ⅙ of the arc. The efficiency fraction is shown in FIG. 2, as the prior art multi-valve line.

An alternative method is to introduce the steam into the turbine at various locations in a multiple stage turbine. Therefore, after the first valve is open completely and is introducing steam before the nozzle 52 (stationary portion 38) for the first rotating stage, a second valve can be opened which can introduce additional steam prior to the second or further stages. For example, the steam turbine 26 in FIG. 1 has a plurality of valves 54. The first valve introduces steam to a nozzle 52 for the first stage. A second valve 54*b* introduces steam into the casing 30 just prior to the nozzles 52 for the second stage 32*b*. A third valve 54*c* introduces steam into the casing 30 just prior to the nozzles 52 for the fourth stage 32*d*. An example of the efficiency fraction is shown in FIG. 2, as the stage valve by-pass line. This configuration can also be used in conjunction with the present invention.

However, both of these techniques have shortcomings. With respect to the partial arc introduction of the steam prior to the first stage, when the turbine is not running at full efficiency capacity, the rotating blades pass through arcs or segments which have steam and then arcs and segments which are void of steam flow because the segments are associated with the closed valves. This passing between the two regions creates a greater stimulus on the rotating blades which has a detrimental affect on the blades and in addition increases the noise generated by the rotating steam turbine.

With respect to the introduction of steam at stages beyond the first stage, one shortcoming is that the overall efficiency at the maximum output is lower because some of the high energy inlet steam by-passes one or more stages.

The above briefly describes two styles of prior art steam turbines. The prior art has shortcomings as discussed above.

A steam turbine 20 according to the invention is illustrated in FIG. 3. The steam turbine 20, similar to previous embodiments, has a rotatable shaft 28 located in a casing or housing 30. The steam turbine 20 has a plurality of stages 72, through which the steam passes from an inlet 34 to an outlet 36. Each stage 72 has a stationary portion 38 and a rotating portion 40. The stationary portion 38 directs steam to the rotating portion 40. All the steam for the steam turbine 20 is introduced prior to the rotating portion 40 of the first stage 72*a* through a first set of nozzles 76 according to the invention. It is however recognized that multi-stage inputs can be used in addition to this invention to further optimize low output performance.

The rotating portion 40 of each of the stages 72 of the steam turbine 20 has a plurality of blades 44 mounted to the shaft 28. Each stage 72 of the moving blades 44 forms a cylindrical disk 46 having a plurality of radial openings 48 defining "buckets" through which the steam passes, similar to those shown in FIG. 1B. The rotating portion 40 is similar to rotating portions of prior art steam turbines.

Similar to the prior art, the stationary portion 38 of each of the subsequent stages 32 of the steam turbine 26 has a plurality of blades 50 carried by the casing 30. Either interposed between the blades 50 or formed with a disk are a plurality of openings 52 defining the nozzle through which the steam passes, similar to those shown in FIG. 1C. The stationary nozzles direct the flow of steam towards the moving blades.

However, in contrast to previous steam turbines, the stationary nozzle 76 of the first stage has a plurality of chambers 78 and 80. Each chamber 78 and 80 is connected to a separate passageway 82 and 84 and a respective control valve 86. The control valve, also referred to as a flow controller or fluid flow regulator can be of alternate construction to that shown, such as poppet type, spool type, low noise "drag", single lift, double lift, venturi or needle valves.

Figure 4:
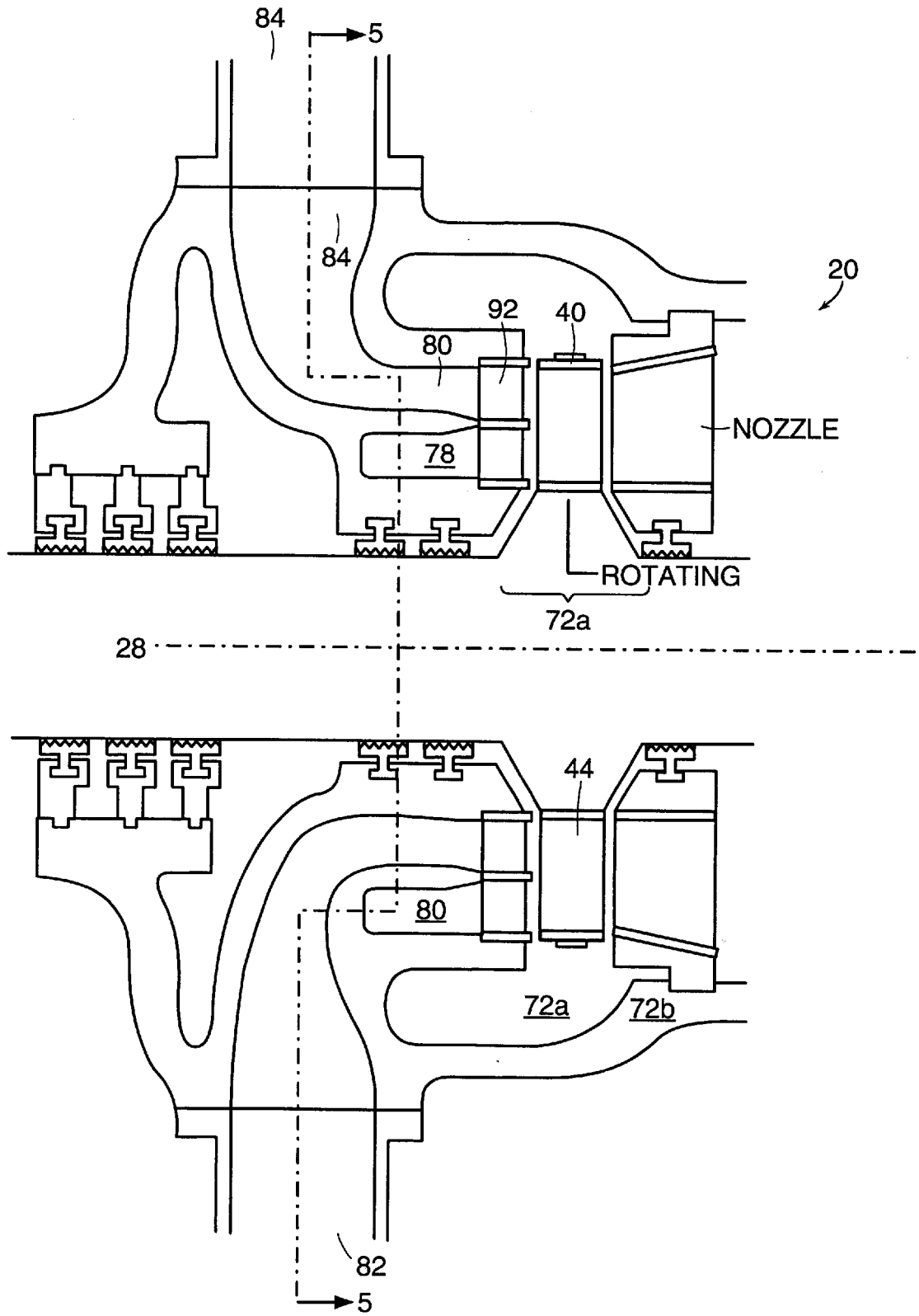
FIG. 4 is a sectional view of an area of the steam turbine of FIG. 3 in proximity to the first stage.

Referring to FIG. 4, the passageway 84 shown on the top directs fluid to the radially outer chamber 80 and the passageway 82 shown on the lower portion of the page directs fluid to the radially inward chamber 78. The stationary nozzles 76 of the first stage have a plurality of blades 92 as described below. The rotating portion 40 of the first stage 72 with a plurality of blades 50 is shown mounted to the shaft 28. The stationary portion 38 of the second stage 72b is also shown.

Figure 5:
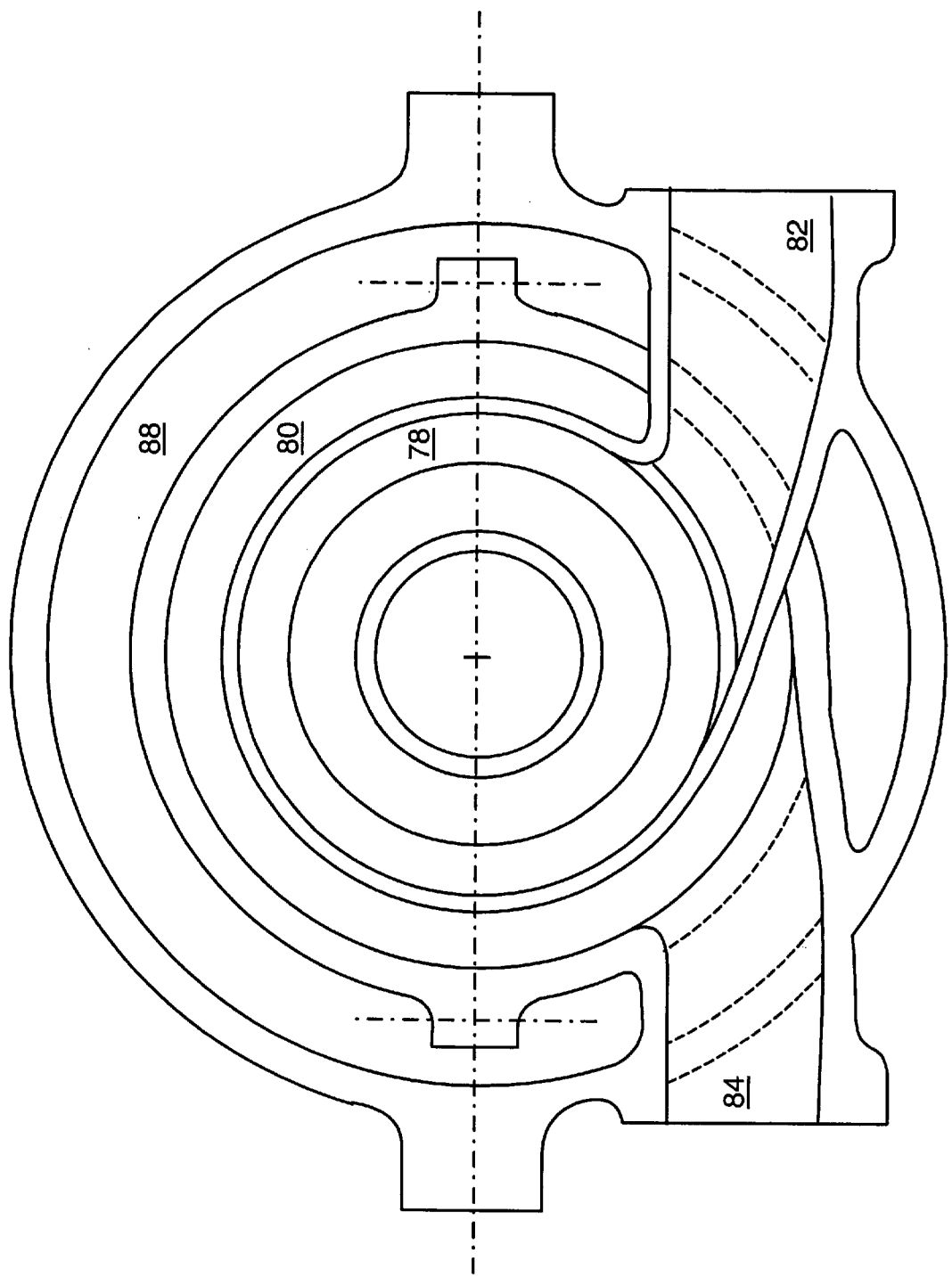
FIG. 5 is a sectional view taken along the line 5—5 of FIG. 4.
Figure 6:
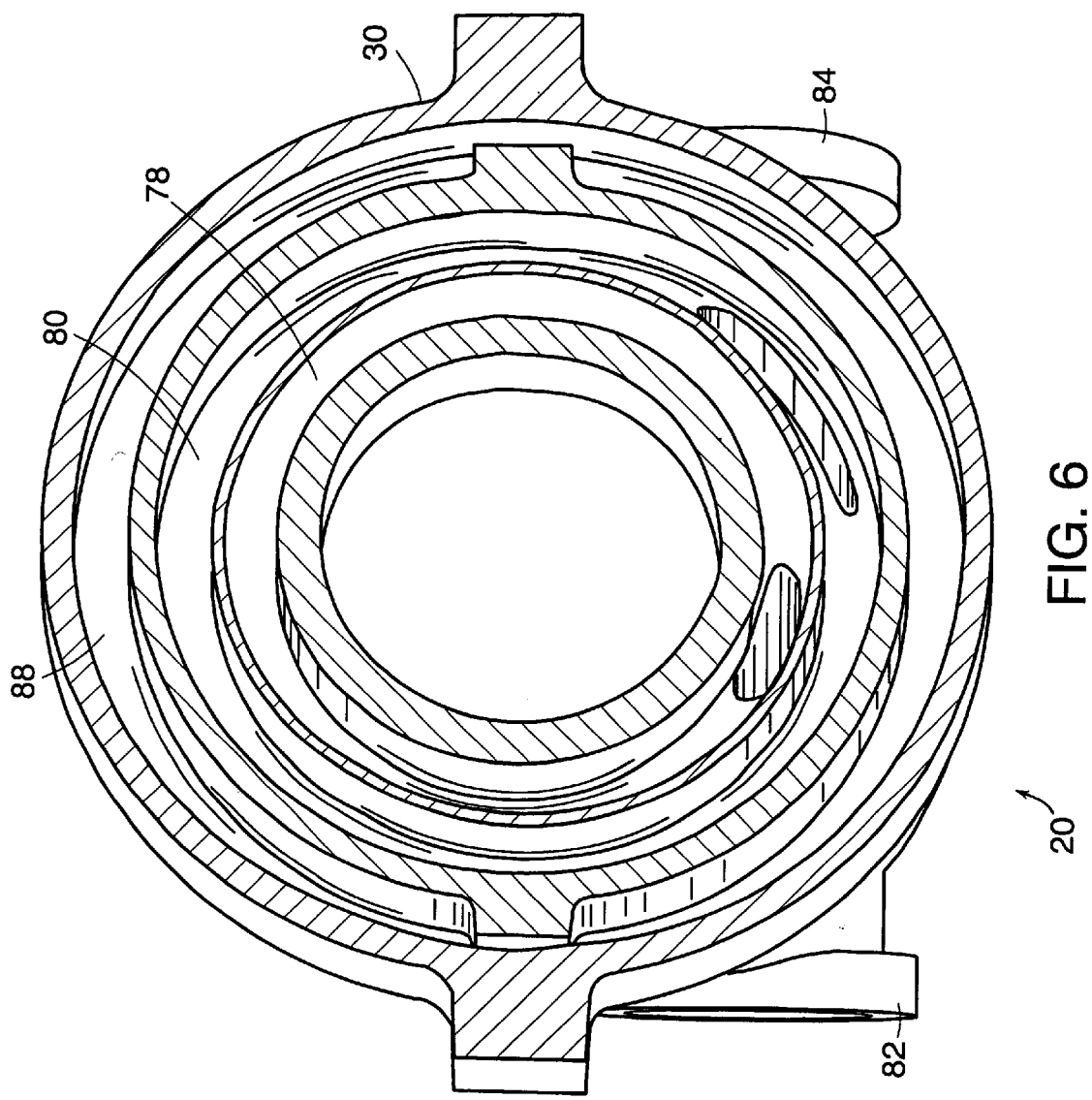
FIG. 6 is a perspective view of the inner chamber.

FIG. 5 is a sectional view of the stationary nozzle chambers 78 and 80 for the first stage looking towards the other stages 72. A perspective view of the inlet nozzle looking away from the stages 72 is shown in FIG. 6, wherein the center opening receives the rotating shaft 28, shown in FIG. 3. The passageway 82 shown on the right in FIG. 5 directs fluid to the inner chamber 78 which extends a complete 360 degrees/full arc around the rotating shaft. The passageway 84 seen on the left side of FIG. 5 distributes steam to the outer chamber 80 which likewise extends 360 degrees around the shaft. The inner chamber 78 encircles the shaft and directs steam which passes through one of the control valves 86. The outer chamber 80 encircling the inner chamber 78, similarly directs steam which passes through one of the control valves. A third chamber 88 is provided to allow for thermal expansion between the nozzle carrying section of the casing 30 and the outer shell.

Figure 7:
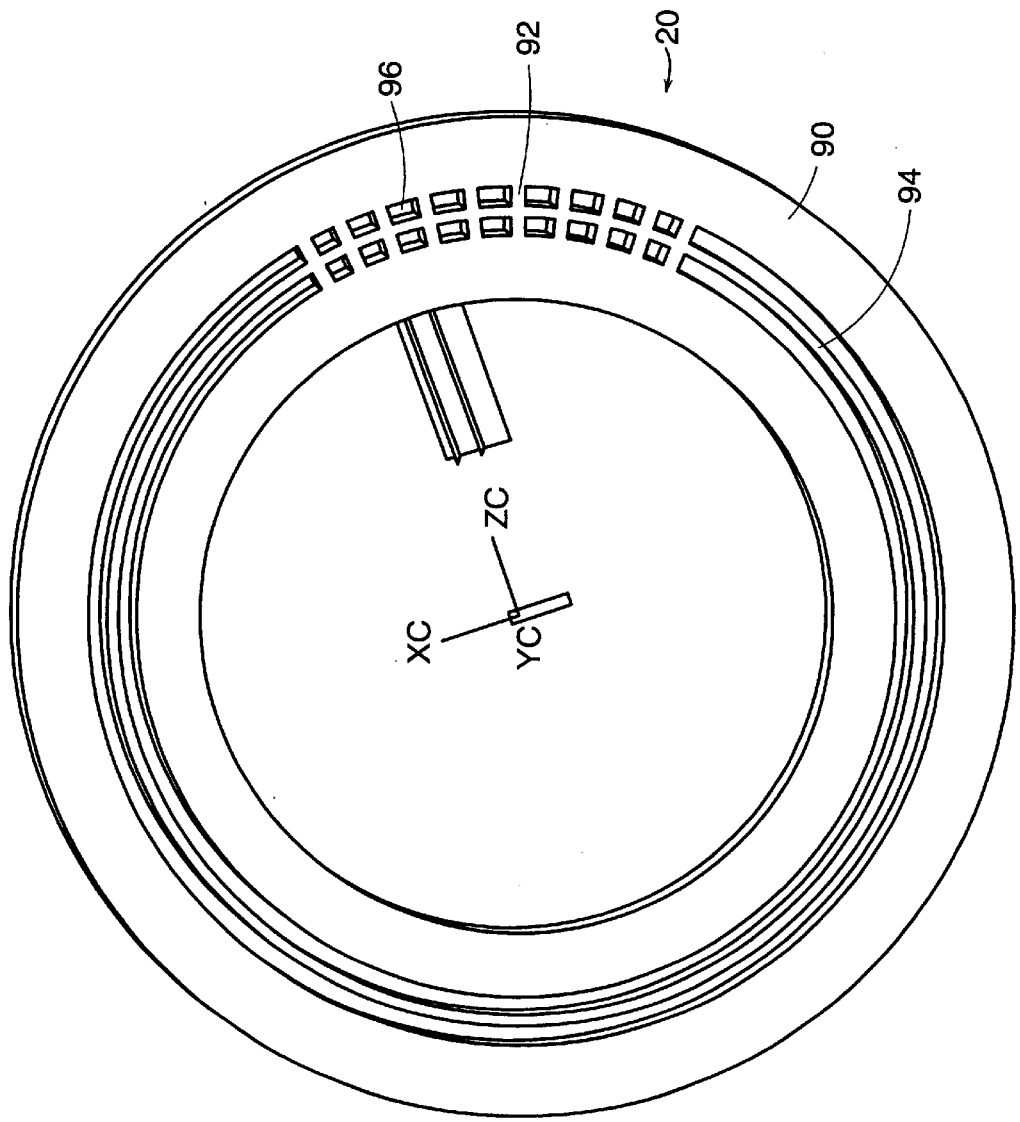
FIG. 7 is a perspective view of the nozzle.

Referring to FIG. 7, the steam turbine 20 has a plate 90 overlying the chambers 78 and 80. The plate 90 has a plurality of blades 92 which define nozzles 96 for directing the steam fluid from the chambers towards the rotating stage. A plurality of blades are removed for clarification. The plate has an annular ring 94 which separates the nozzles defined by the blades 92.

While the spacing and size of the nozzles or openings 96 are shown the same in FIG. 7, it is recognized that the opening of the nozzle can differ between the nozzles for the inner chamber and the nozzles for the outer chamber. It is also recognized that the number of chambers may be greater than two, and distribution of the nozzles between the chambers need not be symmetric. For example, the outer chamber may have greater or fewer nozzles than the inner chamber.

It is further recognized that the preferred sequence for admitting steam to the annular passages 78 and 80 is to allow steam to first enter the chamber 78 in order to minimize stimuli on the rotating blades 44. In an arrangement with more than two annular passages or rings, the preferred sequence of admission would be from inner to outer, i.e. from smaller diameter annular ring progressing in order to the largest diameter annular ring.

Figure 8:
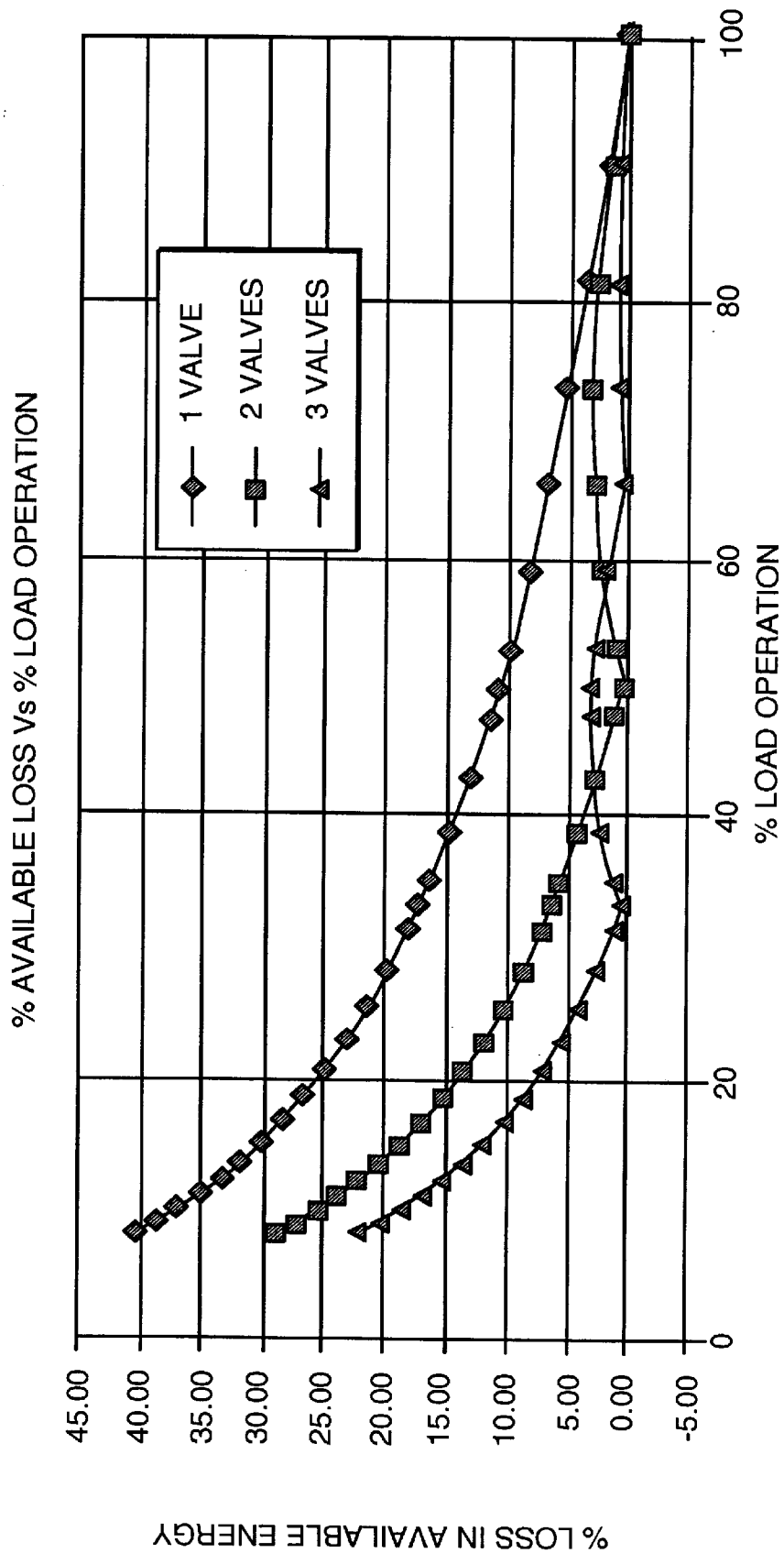
FIG. 8 is a diagram of the percent of available energy loss with respect to 1, 2, and 3 chamber designs versus the percent load operation.

FIG. 8 is a graph showing the present available energy loss versus design load operation for a conventional one valve full arc and that of a two chamber and three chamber full arc design according to the invention. The percentage loss in available energy is minimized for the normal operating range of 40 percent to 100 percent. The multi-chamber multi-valve design reduces the loss in throttling relative to the one chamber single valve design. The efficiencies of such a design, however, are reduced by the fact that the radial active length of the stationary nozzles are lower than the rotating buckets when some of the valves are not operating. i.e. the radial length or height of rotating blade 44 is greater than the height of the stationary blades 92 so that during operation with steam flow to only one chamber, the blades 44 appear oversized relative to the single ring of blades 92 and nozzles 96.

Figure 9:
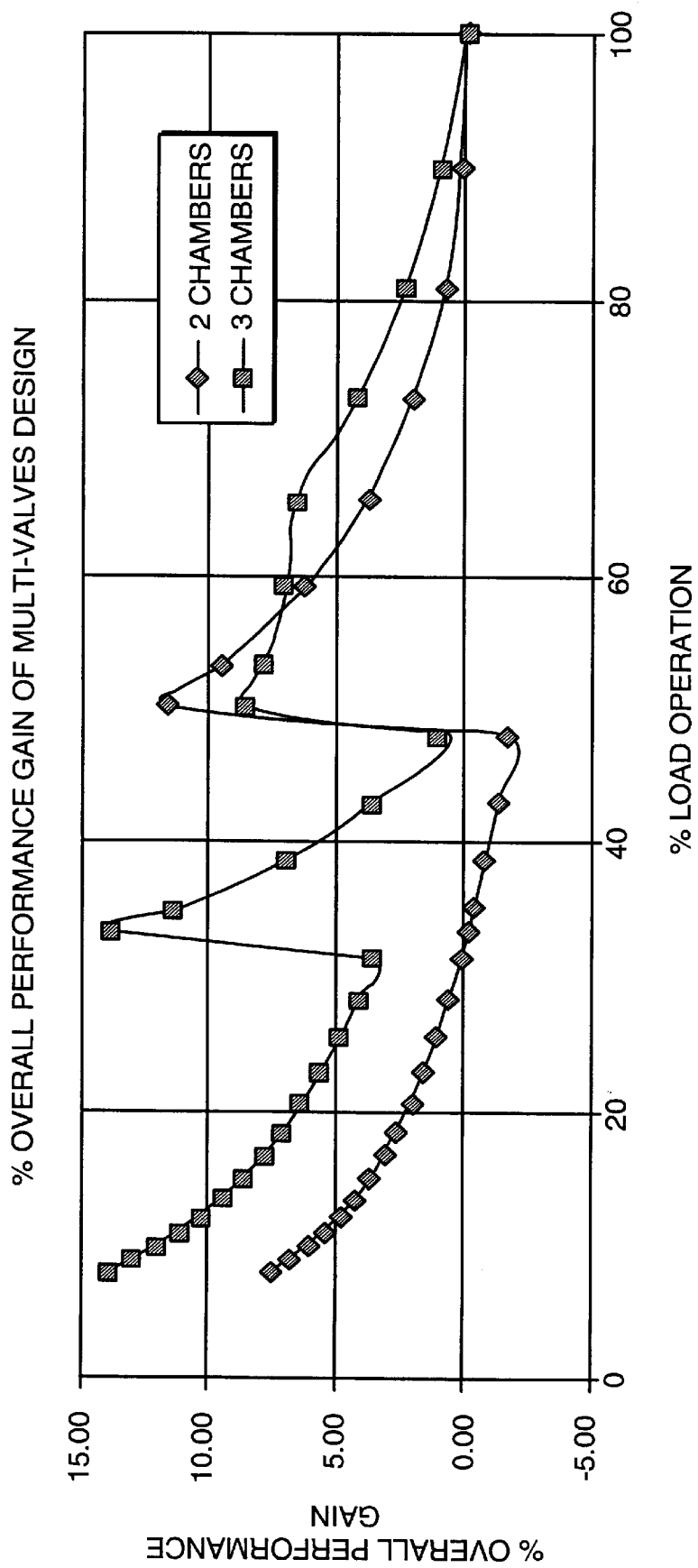
FIG. 9 is a diagram of overall performance gain of a multi-valved design.

FIG. 9 shows the typical efficiency gains of the multi-valve multi-chamber design. The performance of the multi-valve multi-chamber design is shown to be slightly poorer than that of a conventional single valve arrangement at the points just prior to opening of the second and subsequent valves due to the mis-match in radial height of the rotating blade 44, relative to the shorter radial height of the stationary blades 92 or the chamber. This negative performance parameter is included at all points. It is clear to those skilled in the art that when the integral of performance gain is taken, that the net gain in performance is much greater than the reduction due to the is-match in radial height or overlap.

The actual number of valves/chambers for a specific design is typically determined by the design's requirements, e.g. expected operating profile, desired points of maximum efficiency, variations in steam conditions, etc. Additionally, the steam flow distribution between the multi chambers would be tailored for the specific design requirements. For example, a two chamber two valve design can be used with a normal "maximum" operation point is between 50 to 60 percent of the rated output. Multichamber multi-valve designs have higher overall efficiency performance than a single valve one chamber fixed area design by reducing the throttling loss at part load operation.

The steam turbine 20 with the multi-valve full arc according to the invention, reduces the noise compared to a turbine with a multi-valve partial arc inlet and at the same time increases efficiency compared to a single valve or stage valve by-pass turbine as discussed in relation to FIG. 2.

While the steam turbine shown in the figures in describing the invention is an axial-flow multi-stage turbine with an impulse first stage, it is recognized that other styles of steam turbines can have a plurality of circumferential chambers, such as with reaction or compound stages. In addition, radial, helical, or tangential flow turbines, single stage turbines and other turbines likewise can have the plurality of chambers, according to the invention.

Figure 10:
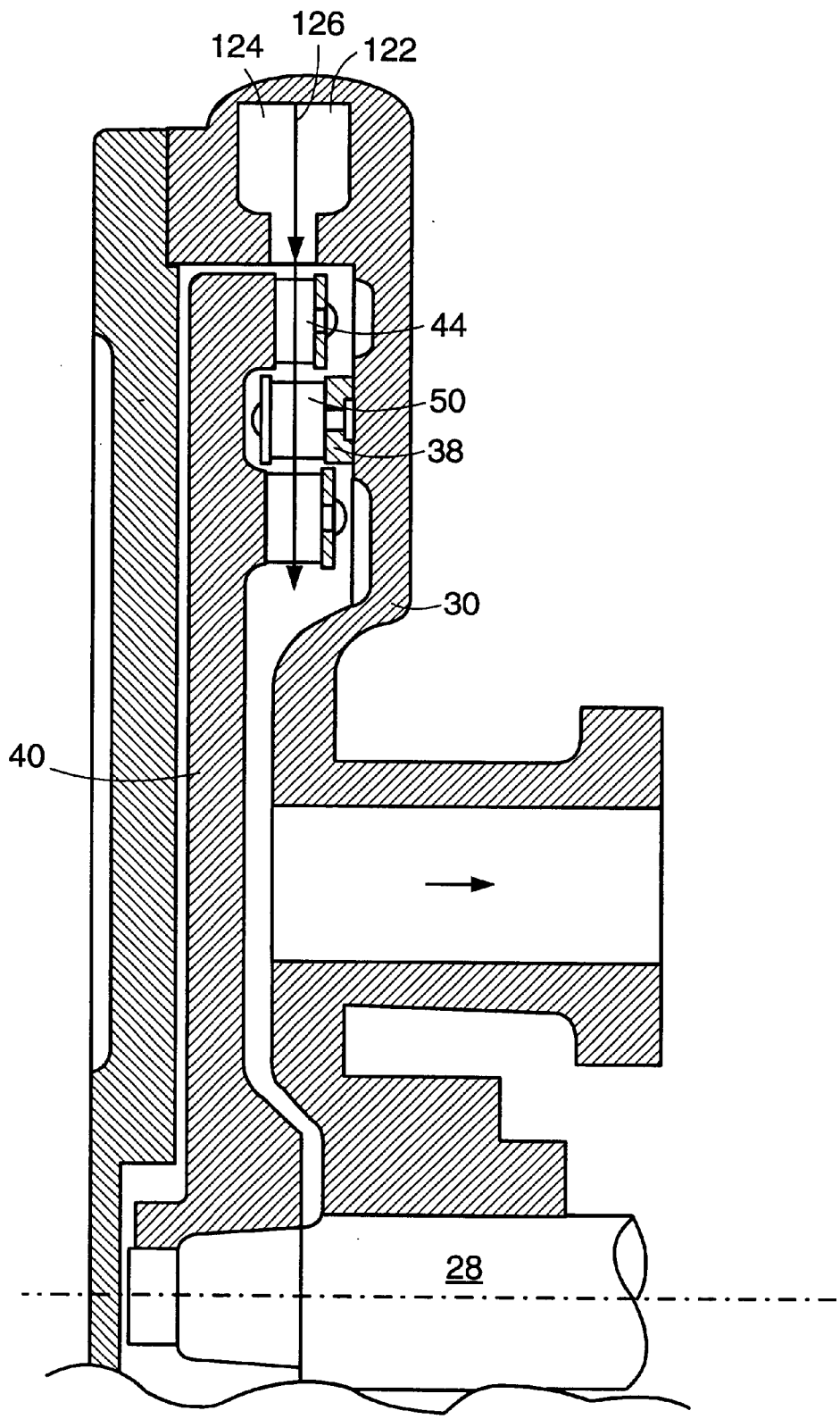
FIG. 10 is a sectional view of a radial flow turbine according to the invention.

For example, in a radial flow turbine the flow of fluid (steam) 120 is towards the shaft 28. The turbine 120 has a rotating portion 40 with a plurality of blades 40. The casing 30 carries the stationary portion 38 with the stationary blades 50. The turbine 120 has a plurality of chambers 122 and 124 which are positioned radially outside and encircle the moving blades 140. The chambers are divided from each other axially by a circumferential ring 126, such as seen in FIG. 10.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A steam turbine having:
   a casing;
   a rotatable shaft carried by the casing;
   a turbine stage having a set of stationary blades carried by the housing defining a plurality of nozzles and a set of rotating blades carried by the shaft, the stationary blades adapted to direct flow of steam towards the rotating blades and the rotating blades extracting energy from the steam;

the improvement comprising:

the stationary blades having at least one annular ring for dividing the nozzles into two sets of concentric rings of nozzles around the shaft.

2. An axial flow steam turbine comprising:

a casing;

a shaft rotatably carried by the casing:

a plurality of moving blades carried by the shaft and adapted for extracting energy from a fluid;

least two sets of nozzles carried by the casing for introducing fluid into the casing, each set of nozzles encircling the shaft and adapted to direct fluid towards the moving blades carried by the shaft; and a chamber for each of the sets of nozzles, each chamber forms a complete arc encircling the shaft for providing fluid to the set of nozzles and a flow controller for regulating the fluid introduced into the chamber, wherein the chambers divided concentrically from each other.

3. A turbine comprising:

a casing;

a shaft rotatably carried by the casing;

a plurality of moving blades, the blades extending radially outward from the shaft and adapted for extracting energy from a fluid; and at least two sets of nozzles carried by the casing for introducing fluid into the casing, each set of nozzles forming a concentric ring around the shaft and adapted to direct fluid towards the moving blades carried by the shaft.

4. The turbine of claim 3 further comprising for each of the sets of nozzles a chamber which forms a complete arc encircling the shaft for providing fluid to the set of nozzles and a flow controller for regulating the fluid introduced into the chamber.

5. The turbine of claim 4 wherein there are three sets of nozzles.

6. The turbine of claim 4 further comprising at least one more set of a plurality of moving blades which extend radially outward from the shaft and adapted for extracting energy from a fluid and at least one set of stationary blades extending radially inward from the casing for directing the fluid towards the set of moving blades.

7. The turbine of claim 3 wherein one of the sets of nozzles is sized to maximize the conversion of pressure change to velocity increase of the fluid for a loading of less than 100 percent.

8. The turbine of claim 7 wherein there are multiple points of the optimal loading.

9. The turbine of claim 3 wherein the nozzles of a set are formed from a pair of annular rings of the casing which are concentric with the shaft and a plurality of blades extending radially between the annular rings, the blades shaped to define an opening for maximizing the conversion of pressure change to velocity increase of the fluid for an optimal loading.

10. A steam turbine comprising:

a casing;

a shaft rotatably carried by the casing;

at least one stage, each stage having a plurality of moving blades extending radially outward from the shaft and the casing defines a plurality of stationary openings, the moving blades adapted for extracting energy from steam, and the stationary openings directing the steam towards the moving blades; and the stationary openings of the first stage having two sets of nozzle openings, the nozzles carried by the casing for introducing steam into the casing, each set of nozzles forming a concentric ring around the shaft and adapted to direct steam towards the moving blades of the first stage.

11. The steam turbine of claim 10 further comprising for each of the sets of nozzles a chamber which forms a complete arc encircling the shaft for providing steam to the set of nozzles and a flow controller for regulating the steam introduced into the chamber.

12. The steam turbine of claim 11 wherein there are three sets of nozzles.

13. The steam turbine of claim 11 wherein there is at least two stages and the stationary openings of the second stage extend radially inward from the casing for directing the steam from the previous stage towards the set of moving blades of the stage.

14. The steam turbine of claim 13 wherein one of the sets of nozzles is sized to maximize the conversion of pressure change to velocity increase of the steam for an optimal loading of less than 100 percent.

15. The steam turbine of claim 14 wherein there are multiple points of optimal loading.

16. The steam turbine of claim 15 wherein one of the optimal loading is between 62 and 72 percent of the maximum loading.

17. The steam turbine of claim 14 wherein the nozzles of a set are formed from a pair of annular rings of the casing which are concentric with the shaft and a plurality of blades extending radially between the annular rings, the blades shaped to define an opening for maximizing the conversion of pressure change to velocity increase of the steam for an optimal loading.

18. An inlet for a steam turbine comprising:

a casing defining a pair of chambers, each chamber having an inlet and an outlet, the outlet being circular and adapted to encircle a shaft of the turbine; and a pair of sets of nozzles, the nozzles carried by the casing and connected to a chamber for introducing steam into the casing, each set of nozzles forming concentric rings around the shaft and adapted to direct steam towards the moving blades of the first stage.

19. The inlet for a steam turbine of claim 18 further comprising a fluid flow regulator for each of the sets of a chamber and a set of nozzles.

20. The inlet of claim 19 wherein there are three sets of a fluid flow regulator, a chamber, and sets of nozzles.

* * * * *

UNITED STATES PATENT AND TRADEMARK OFFICE
CERTIFICATE OF CORRECTION

PATENT NO.   : 6,386,829 B1
DATED        : May 14, 2002
INVENTOR(S)  : Vitone, Jr. et al.

It is certified that error appears in the above-identified patent and that said Letters Patent is hereby corrected as shown below:

Column 7,
Line 11, please insert -- at -- to beginning of sentence.

Signed and Sealed this

First Day of October, 2002

Attest:

Attesting Officer

JAMES E. ROGAN
Director of the United States Patent and Trademark Office